Figure 1:
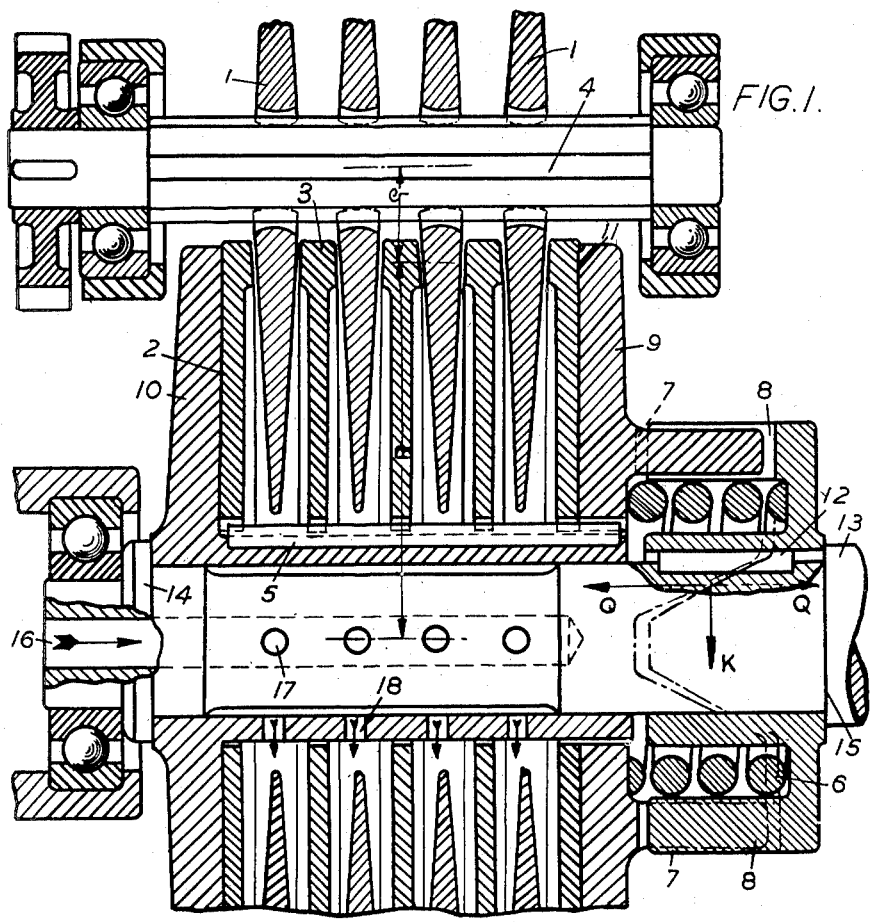

May 1, 1956  J. BEIER  2,743,621

INFINITELY VARIABLE FRICTION WHEEL GEARS

Filed Nov. 1, 1950  2 Sheets-Sheet 1

Inventor
Josef Beier,
By Flocks and Simon
Attorneys

United States Patent Office 2,743,621
Patented May 1, 1956

2,743,621

INFINITELY VARIABLE FRICTION WHEEL GEARS

Josef Beier, Schlosspark, Austria

Application November 1, 1950, Serial No. 193,419

Claims priority, application Austria November 2, 1949

15 Claims. (Cl. 74—199)

This invention relates to infinitely variable friction wheel gears.

Such gears have been constructed with friction wheel elements of various forms but the transmission of power through them, is, in almost all cases, effected due to direct frictional contact between the driving and driven wheels, i. e. due to "dry friction." In the remaining cases, however, where provision is made to supply a small quantity of a lubricant, such as oil, to the operative friction surfaces of the wheels, there is only produced between the contacting surfaces a friction corresponding to the transition point between "dry friction" and the so-called "boundary lubrication." Both types of friction have the disadvantage that wear of the friction wheel elements occurs during the operational life of the gear due to the mutual wearing away of the uppermost particles of the contacting friction surfaces which is caused by the direct contact between them.

The object of the present invention is to provide an improved infinitely variable friction wheel gear in which this disadvantage is overcome or greatly minimised.

In my prior Patent No. 2,222,281 there are described friction wheel gears comprising a central shaft carrying a set of friction wheels, a series of outer shafts disposed parallel with and equally spaced from the central shaft and each carrying a set of friction wheels inter-digitating with those on the central shaft, all the friction wheels being slidably but non-rotatably arranged upon their respective shafts, means capable of applying axial pressure to the set of wheels on the central shaft, and means whereby the outer shafts may move to vary their distance from the central shaft, either the wheels on the central shaft or those on the outer shafts, or both, being mounted so that they may become inclined to a limited degree with respect to the shaft carrying the same, and either the wheels on the outer shaft or those on the central shaft being each formed with a thickened rim by which it engages the wheels with which it is in contact.

Certain of the features of the gears described in this earlier specification are utilised in carrying the present invention into effect but use is additionally made of the still little known property of lubricating oils of increasing substantially in viscosity when subjected to relatively high pressures.

Broadly stated, this invention consists in an infinitely variable friction wheel gear in which the transmission of power from the driving to the driven wheels is effected through several points of contact each of relatively restricted area, and in which either the driving or the driven wheels are subjected to a pressure tending to urge the cooperating wheels into direct contact at the points referred to, characterised by the fact that a liquid having a relatively high viscosity, exemplified by a lubricating oil, is made available at the points of contact so that it will form a film between the cooperating surfaces of the driving and driven wheels at each of these points, and that the pressure to which the wheels are subjected is so regulated that it will apply to each of the films of liquid a specific pressure high enough to cause the viscosity of the liquid in the film to increase at least several hundredfold but not sufficiently high to squeeze the film out from between the cooperating surfaces, whereby the transmission of power is entirely effected through the liquid films.

The type of friction utilised in a gear according to the invention is the so-called "fluid friction," or at least a friction lying between that corresponding to boundary lubrication and that known as fluid friction and approaching more nearly to the latter.

In order that the invention may be carried into practice, detailed information is given below of the best way of effecting this that is known to me at present, reference being made to the accompanying drawings.

Figure 2:
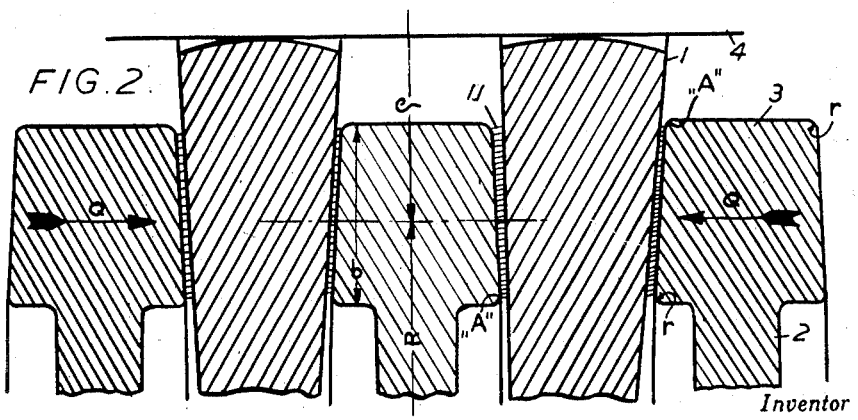
Figure 3:
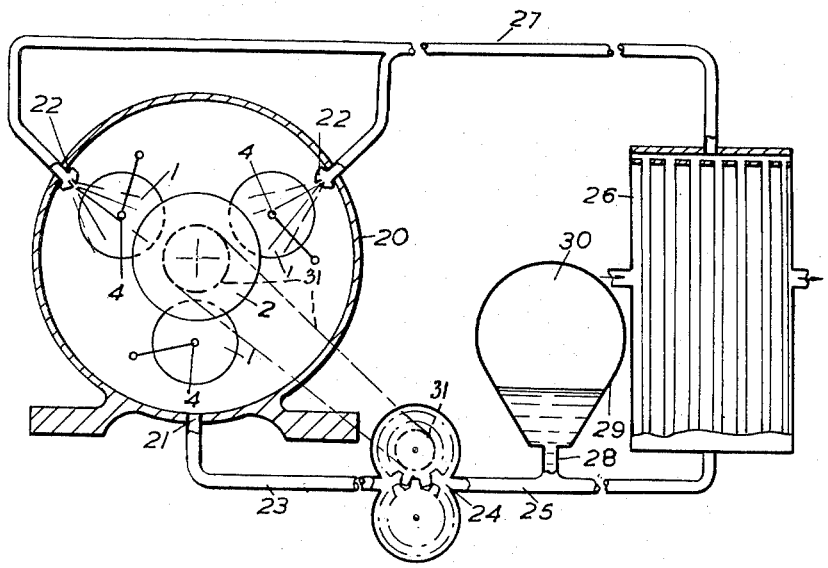

In these drawings, which illustrate a gear embodying constructional features also to be found, in part, in the gears described in my said earlier specification No. 2,222,281:

Fig. 1 is a fragmentary view, in longitudinal section, of so much of the gear as is necessary to an understanding of the invention, Fig. 2 is a detail view, to a larger scale, showing the points of contact between the friction wheels with the liquid films formed thereat, and Fig. 3 is a somewhat diagrammatic sectional view illustrating a gear according to the invention adapted to operate with a reduced internal pressure.

With fluid friction, for two surfaces each of the area F which are separated by a film of a thickness $h$ composed of a liquid having the viscosity $\eta$ and which move parallel to one another with the relative velocity $v$, the drag or displacement force P is given by $$P = \frac{\eta \cdot F \cdot v}{h}$$

If the viscosity of the liquid assumes a considerable magnitude, assuming that the film thickness $h$ is of that smallness which would result from the high pressures developed between co-operating friction elements, the drag force P at each point of contact, even with small slip velocities $v$, can reach a value sufficient to ensure transmission of power via the liquid film. In order to obtain contact surfaces F which are sufficiently large and readily calculable as to shape, as well as for reasons explained in greater detail hereinafter, the co-operating friction elements employed (see Figs. 1 and 2) are of forms already known per se, i. e. double conical discs 1 which engage between counter friction elements 2 each having a runner rim 3 the operative face or faces of which are formed with the same conical inclinations as the surfaces of the discs 1 upon which they run. The discs 1 are mounted on splined shafts 4 and the elements 2 are mounted on keys 5 on a hub portion of an end disc 10, the discs 1 and the elements 2 being rotatable with the shaft 4 or disc 10, respectively, while being axially displaceable relative thereto. The discs and elements are pressed togethher under the action of an axial pressure Q applied by the springs 6, or by means 7, 8 hereinafter described, acting through the end discs 9 and 10. A film 11 of liquid forms between the co-operating surfaces of the discs 1 and the rims 3 in the manner described below.

Under the action of the pressure Q, the discs 1 and the rims 3 are elactically deformed in such manner that an approximately rectangular contact surface is produced, the breadth $b$ of which is equal to the rim breadth and the length L (in mms.) of which, according to the Hertz formula for the contact of curved bodies is approximately given by $$L = 20\sqrt{\frac{2.32 \cdot Q \cdot r}{E \cdot b}}$$

where Q is the application pressure in kgs., $$r_i = \frac{r_1 \cdot r_2}{r_1 + r_2}$$

is the ideal radius of curvature of the friction elements or counter friction elements at the points of contact, $r_1$ and $r_2$ are the actual radii of curvature at such points, $b$ is the rim breadth in mms., and $E$ is the elasticity modulus in kg./cm.$^2$. The maximum specific pressure in the contact surface is given, according to a second formula of Hertz, as $$p = \sqrt{\frac{17.5 \cdot Q \cdot E}{b \cdot r_i}}$$

in kg./cm.$^2$. For example, if the specific pressure is 5000 kg./cm.$^2$, a normal lubricating oil at a temperature of 20° C., in consequence of the relationship governing increase of viscosity with pressure which applies at this temperature, namely $$K_{20} = 10\left(\frac{p}{1000}\right)$$

has a viscosity 100,000 times that which it has at atmospheric pressure. At 50° C., this relationship is $$K_{50} = 7\left(\frac{p}{1000}\right)$$

and consequently the viscosity is only increased about 32,000 times. For an area of the contact surfaces of, for example, only 10 mm.$^2$ at the above specific pressure and at a temperature of 20° C., the fluid friction or the drag force P is equivalent to that fluid friction which occurs when two surfaces each having an area of 1 $m$.$^2$ are separated by a liquid film of a thickness of $h$ and move relative to each other with the slip speed $v$. This comparison shows the importance which the invention possesses in utilising the viscosity increase of the liquid film with pressure in producing a wear-free engagement in high efficiency friction wheel gears. In order to obtain a sufficiently large length L for the contact surfaces F, it is essential, according to the above, to have a large ideal radius of curvature $r_i$, which would normally mean that the friction wheels must have large radii of curvature $r_1$ and $r_2$.

By employing flat cones as the friction elements, however, it is possible to obtain desirably large radii of curvature with minimum space requirements. If the inclination of the conical surface towards the plane perpendicular to the axis of the cone is 1:X, the radius of curvature of the surface at a radius $\zeta$ is practicaly equal to $\zeta \cdot X$. Thus, assuming that the inclination of the conical surfaces is, for example, 1:30, that the contacted annulus of each disc 1 has a mean radius $\zeta = 20$ mm. (see Figs. 1 and 2), and, furthermore, that the rims 3 have a mean radius of $R = 100$ mm., the effective radii of curvature at the contact location are $r_1 = 600$ mm. and $r_2 = 3,000$ mm.

Such large radii of curvature cannot be provided in such a small space with any other method of construction and consequently the inventive idea of employing flat-conical friction elements for producing contact surfaces which are sufficiently large to make it possible to utilise fluid friction represents an important technical advance.

However, the large radii of curvature are necessary also to ensure the formation of as thin a wedge of liquid as possible immediately in advance of the point of contact in order that the high fluid pressure at the point of contact may be produced, since it is only in this way that the liquid is sufficiently drawn between the friction elements, a parallel case to this being found in the theory of fluid friction of sliding bearings.

In order that the slip speed $v$, which is absolutely necessary for the existence of fluid friction, may be kept small relative to the rolling speed of the friction elements, a high rolling speed V is required. As will be appreciated from the foregoing, however, the factors of extreme importance in ensuring an adequate value of the fluid friction are the greatest possible uniformity of the microscopically small film thickness $h$ and the most uniform distribution possible of the specific pressure $p$ during the rapid running of the friction elements. In order that these may be automatically adjusted to the optimum value, independently of inaccuracies in machining, of deformations of the friction elements which cannot be calculated beforehand, and of errors which would result from a rigid axial guiding of the friction elements on their shafts 4, it is a further feature of the invention that the friction elements are allowed to position themselves under the action of the resultant total pressure in the places of contact. To this end, the friction elements are so guided on their shafts that they can adjust themselves, to a small degree, in order to bring their medial planes into inclined positions in relation to (i. e. not normal to) the axis of rotation, as shown by way of example for the disc 1 at the right-hand side of Fig. 1 and Fig. 2. This mobility of the friction elements can be ensured by forming them with a guiding surface which is relatively short axially, or by forming their guiding surfaces to afford a suitably large clearance around their shafts, or by forming the surfaces of part-toroidal shape as shown in Fig. 1 and Fig. 2. It can be clearly seen from Fig. 2, incidentally, how the film 11 of liquid is disturbed by the assumption of an inclined position by the friction element 1 relative to the counter friction elements 2. The specific surface pressure at the points "A" is increased to a multiple of that which should prevail over the whole area of the film, whereas the drag force P is considerably reduced in value because the average film thickness $h$ becomes too large.

The free mobility of the friction elements has already been proposed, for other reasons, in my earlier Patent No. 2,222,281. Whereas it is stated, however, in that specification that the friction elements adjust themselves perpendicular to the axis of rotation because of centrifugal action, it is a further feature of the present invention that this centrifugal action be kept as small as possible in order not to disturb the aforementioned automatic adjustment under the action of the resultant surface pressure at the points of contact. Consequently, the flat-conical friction elements 1 are only made as thick at the outer edge as is essential on the grounds of strength (see Fig. 1). In this way the mass, and more important, the moment of inertia of the friction elements, the latter related to a diameter as axis, becomes a minimum, so that the friction elements, during running, yield unrestrictedly to the small adjusting moments which are continuously exerted at the points of contact. Moreover in order to reduce disturbing mass effects, the rim 3 of each counter friction element 2 is only made of an axial thickness about equal to the difference between the thicknesses of a bevel disc 1 at the shaft and at the outer edge. Moreover, according to the invention, it is of importance for ensuring a satisfactory formation of the film of liquid during running to round off the rim 3 at the inner and and outer edges (radius $r$ of Fig. 2), since by this means the liquid is drawn between the friction elements by the relative radial motion of the latter.

In order that any accidental irregularities at a point of contact shall not exert an undue influence on the functioning of the gear and in order to increase the capacity of the gear, a relatively large number of friction elements are used in known manner, these being arranged in a row on each of several shafts.

In order to make the drag force P as large as possible per point of contact (according to the formula $$P = \frac{\eta \cdot F \cdot v}{h})$$

the viscosity $\eta$ of the liquid must be as high as possible, since the area F of the contact surfaces must be restricted and the slip speed $v$ must be as small as possible.

However, as mentioned above, the increase in viscosity with increase in pressure is substantially reduced with rising temperature, as also is the viscosity itself, so that, as a further feature of the invention, cooling of the liquid is provided, this cooling being more intensive than that necessary for the satisfactory running of the gear. In order that this cooling may be effective at the points of contact themselves, the friction elements may either dip into the cooled liquid or, for the purpose of avoiding dipping losses, be washed with cooling liquid supplied from the centre through the bores 16, 17 and 18. Due to this super cooling, the viscosity of the liquid at the points of contact is raised, whereby the applying pressure and the slip speeds, and thus the losses, can be reduced thus increasing the efficiency of the gear. In order further to raise the viscosity of the liquid, there may be selected as the liquid one in which the viscosity increase under pressure, is especially large. Alternatively, special additions may be made to the lubricating oil, such as additions of sublimated sulphur, colloidal graphite or chlorinated diphenyl. Where it is a question of the greatest possible stability, i. e. independence of temperature changes, silicones may be added to the oil. Again, electrically treated oils and extreme-pressure lubricants may be used, if desired. Furthermore, and this is another feature of the invention, the running surfaces of the friction elements may be chemically or mechanically treated in order to influence, by molecular forces, the formation and properties of the liquid film. A suitable treatment is the application of a hard chromium plating, or a phosphatizing treatment, so that the molecules of the liquid will adhere to the treated surfaces particularly well.

The value of the applying pressure Q at the points of contact is of great importance with the gear forming the subject of the present invention. If it is too high, the film of liquid is squeezed out; if it is too low, the thickness $h$ of the film becomes too big, and, in order to generate the necessary drag force $$P = \frac{\eta . F . v}{h}$$

the relative speed $v$ of the friction elements, that is, the slip, would have to become too great, so that the gear would slip completely. It is a characteristic of such a gear, and a great advantage thereof, that the slip increases upon overloading and thereby mitigates load shocks. Only a gear with an oil film between the friction elements is capable of running, for example, for an hour with a slip of more than 10% of the power take-off speed, without damage to the friction elements.

It is already known to produce the applying pressure, for example, by means of springs independently of the load, or to vary such pressure automatically with the load by special means. It is a further feature of the present invention to employ both means in combination. As clearly shown in Fig. 1, the means for the automatic adaptation of the applying pressure consists of cams 7 which engage in counter cams 8 in the manner of a dog clutch. The full torque which is effective in the gear is transmitted to the shaft 13 from the friction elements 2 by way of the keys 12 and cams 7, 8. In the course of this, a tangential force K arises between each cam 7 and countercam 8, and this force, because of the slope of the cam surfaces, produces an axial force Q which axially compresses the end disc 9 and thus the friction elements 1 and 2.

This axial force is then taken up by the collar 14 of the shaft 13, by way of the end disc 10, and thus annulled so far as the exterior of the gear is concerned since the corresponding reaction Q' at the countercam 8 is transmitted to the shoulder 15 of the shaft 13. By means of the curved shape of the cam surfaces, shown dotted in Fig. 1, the result is achieved that the axial pressure Q increases in relation to the force K, i. e. with respect to the torque, during the running of the friction elements 1 on greater radii $f$. This is necessary, because the specific surface pressure decreases due to the radius of curvature $r_1$ then being larger, and moreover, the liquid is drawn in more strongly between the friction elements 1 and 2 due to the increase in the rolling speed V, whereby the thickness of the film $h$ would be increased too much.

By simultaneously applying pressure by the spring 6 and the cams 7, 8, in accordance with the invention, the effect now to be described is achieved: If the applying pressure Q were to be produced solely by a spring 6 of suitable strength, the slip in the gear would greatly increase upon overloading and finally, with a certain degree of overloading, the gear would slip completely. On the other hand, with partial loading, where greater film thicknesses $h$ would be permissible, the applying pressure would be unnecessarily high and thus have a detrimental effect on the efficiency under partial load. Conversely, however, if the applying pressure were produced only by the cams 7 and 8, this pressure would certainly be lower under partial load but would become so great with overloading that the slip which would then be desirable could not take place. By the combination of spring and cams in accordance with the invention, in which each part exerts only a predetermined portion of its effect, such portion being more or less preponderant according to the desired operating conditions, the result is obtained that the applying pressures under partial loading are smaller than under full load, whereas there is still slip in the gear under relatively heavy overloading, since then the action of the cams alone is inadequate.

Summarising, the following technical advantages are obtained with a gear constructed in accordance with the invention above described: (1) there is practically no wear on the friction elements due to the film of liquid between them, (2) the efficiency is higher, especially under partial load, (3) insensitivity to overloading and shocks, due to the capacity for running a relatively long time with slip, and (4) due to the internal cooling at the points of contact, because of the liquid, the possibility of transmitting large powers per point of contact.

In practical tests of a gear according to the invention the following information has been ascertained but it is to be understood that these details are in no way limitative of the invention.

The highest specific pressure at the contact points when the rim-discs are running on the largest radius of the conical discs (outermost position of the conical discs) is about 1000 kg./cm.$^2$, calculated by the Hertz formula given above, but becomes about 5000 kg./cm.$^2$ when the rim discs are running on the smallest radius of the conical discs (innermost position of the conical discs). The ratio of the drag force P to the application pressure Q at the contact points is about 0.02 for the outermost position of the conical discs and about 0.03 to 0.04 for the innermost position of these discs. The width $b$ of the operative or running surfaces of the rims on the rim-discs is about ¼ to ⅛ of the smallest effective radius of the conical discs ($f$ in the innermost position of these discs). The viscosity of the oil used varied between 10 and 300 centistokes at 130° F.

Further experiments are being made with still thicker oils.

It will have been appreciated from the foregoing description that the friction elements in a gear according to this invention are required to rotate at relatively high speeds and to be many in number. Since losses due to air friction may, in such circumstances, become quite considerable, it is also a feature of this invention to provide for the reduction of such air friction losses either by reducing the pressure of the atmosphere within the housing of the gearing below that of the external atmosphere or by filling the housing with a gas which is much lighter than air, for example, hydrogen or helium. Moreover, it may be desirable at these high speeds of the friction elements to reduce as far as possible the losses which may arise due to the motion of the friction elements through a body of liquid. This can be achieved by arranging for the supply of the liquid necessary to form the power-transmitting films in the form of a mist through which the friction elements will rotate.

The diagram of Fig. 3 illustrates these features of the invention and shows a housing 20 containing a gear such as has already been described, the double conical discs 1 being mounted on shafts 4 which are displaceable towards or from the friction elements 2. The housing 20 is closed in a pressure-tight manner except for an outlet 21 at its lowest point and two inlets fitted with atomising nozzles 22 arranged one on each side of its highest point. From the outlet 21 a pipe 23 leads to an oil circulating pump 24 which delivers into a pipe 25 leading to an oil cooler 26. From the latter a pipe 27 conducts the cooled oil to the atomising nozzles 22 which dispose it into the atmosphere within the housing 20 in the form of a fine mist.

Into the pipe 25, at a convenient point, is connected a branch pipe 28 leading into an air vessel 29, the level to which the oil rises in this vessel depending upon its pressure and therefore the degree to which the air in the space 30 of the vessel is compressed.

The space within the housing 20 may be partially evacuated of air by means of a suitable pump or may be filled with a protective or inert gas such as hydrogen or helium. It is, however, possible, by arranging for the pump 24 to be driven direct from the driving shaft of the gear arranged in the housing 20 as by means of the chain and sprocket gearing 31 shown in broken lines in Fig. 3, to ensure that an increase in the speed of the driving shaft will automatically cause a reduction in the gas pressure within the housing. This will be due to the fact that the higher rate of delivery of the pump will cause the pressure of the liquid to increase on the delivery side of the pump, since the increased quantities of liquid can only pass through the atomising nozzles if subjected to a higher pressure. Consequently, the volume of the air space 30 in the vessel 29 will be reduced and the corresponding increase in the volume of that portion of the circulatory system which is filled with liquid externally of the housing 20 will produce a reduction in the pressure within the latter.

Where the gas filling the housing 20 is air, the reduction in the pressure of this gas results in less oxygen being present within the housing. If the gas is hydrogen or helium there is complete freedom from oxygen in the interior of the housing. In both cases it is possible to employ as the liquid for forming the power-transmitting films in the gearing, a liquid which has a certain sensitivity to the action of oxygen. For example, with certain oils the aging thereof normally produced by the action of oxygen will be prevented or substantially delayed.

It is also a feature of this invention to fill the housing of the gearing with a special gas which will interact chemically with the mist of liquid or with the surfaces of the friction elements.

I claim:

1. An infinitely variable friction wheel gear comprising a driving shaft, a plurality of driving wheels operatively connected with the driving shaft, a driven shaft, a plurality of driven wheels operatively connected with the driven shaft and each having a relatively restricted area thereof disposed closely adjacent to an area of corresponding size on a co-operating driving wheel, means enabling films of a liquid having a high viscosity to form between the said areas on the co-operating driving and driven wheels, and means including resilient means and a plurality of cooperating cam elements for causing the said areas to apply a specific pressure to the respective liquid films located between them which will cause the viscosity of the liquid in each film to increase at least several hundredfold and thereby enable the films to transmit power from the driving to the driven shaft, said cam elements being responsive to the load on said driven shaft, and said resilient means applying pressure independently of the load on said driven shaft.

2. An infinitely variable friction wheel gear comprising a central shaft, a set of wheels mounted on the said shaft, at least one outer shaft disposed parallel with the central shaft, a set of wheels mounted on each outer shaft to inter-digitate with the wheels on the central shaft, all the wheels being slidably but non-rotatably arranged on their respective shafts, means whereby the outer shafts may move to vary their distance from the central shaft, means whereby a liquid of high viscosity may form a film between each wheel on the central shaft and each of the co-operating wheels on the outer shafts, and means including means responsive to the load on said outer shaft for applying axial pressure to the co-operating wheels to cause the viscosity of the liquid in each film to increase at least several hundredfold.

3. A gear as claimed in claim 2, in which one of each pair of co-operating wheels is formed with a thickened rim.

4. A gear as claimed in claim 2, in which one of each pair of co-operating wheels is inclinably mounted on the respective shaft.

5. A gear as claimed in claim 2, in which one of each pair of co-operating wheels is a flat conical element and the other wheel of the pair is constructed with a rim having conical operative faces of the same inclination as the conical faces of the element.

6. A gear as claimed in claim 2, in which the wheels are constructed to have the smallest practicable moment of inertia.

7. A gear as claimed in claim 2, including cooling means for increasing the viscosity of the liquid in the films.

8. A gear as claimed in claim 2, in which the liquid is one having a particularly high increase in viscosity with increase in pressure.

9. A gear as claimed in claim 2, including a housing enclosing the gear elements and means for producing a reduced pressure within the housing.

10. A gear as claimed in claim 2, in which the means for enabling the liquid to form films comprises means adapted to atomise the liquid over the several sets of wheels.

11. A gear as claimed in claim 2, including a housing enclosing the gear elements, an outlet connection from the housing, at least one inlet connection to the housing, an atomising nozzle arranged in each inlet connection, a liquid circulating circuit connecting the outlet connection to each inlet connection externally of the housing, a pump inserted in the said circuit, and an air vessel connected into the circuit at a point between the pump and the inlet connection.

12. An infinitely variable friction wheel gear comprising a central shaft, a set of wheels mounted on said shaft, at least one outer shaft disposed parallel with the central shaft, a set of wheels mounted on each outer shaft to inter-digitate with the wheels on the central shaft, a liquid film of high viscosity formed between said wheels on the outer shaft and said wheels on said central shaft, all the wheels being slidably but non-rotatably arranged on their respective shafts, said wheels on said central shaft being formed with a thickened rim, said thickened rim having conical operative faces, the corners of said thickened rim being rounded at the inner and outer edges thereof, whereby said liquid may be more readily drawn between the cooperating faces of said wheels, means whereby the outer shafts may move to vary their distance from the central shaft, and means including means responsive to the load on said outer shaft for applying axial pressure to the cooperating wheels to cause the viscosity of the liquid in each film to increase at least several hundredfold.

13. In an infinitely variable friction gear as set forth in claim 12, wherein said central shaft is provided with means for introducing cooling means to the contact surfaces of said wheels, said cooling means reducing the temperature of said liquid film between said wheels thereby raising the viscosity of the film at the points of contact and enabling the applying pressure and slip speeds to be reduced, thus increasing the efficiency of the gear.

14. In a friction wheel gear, a driving shaft, a plurality of driving wheels mounted for rotation on said driving shaft, a driven shaft, a plurality of driven wheels mounted on said driven shaft, each of said driving wheels being interposed between a pair of driven wheels, and defining a relatively restricted area therebetween, a film of liquid disposed in the relatively restricted areas between said driving wheels and driven wheels, and means for urging said driving and driven wheels toward each other, thereby increasing the viscosity of the liquid films, transmission of power from said driving wheel to said driven wheel being effected entirely through said liquid films.

15. In a friction wheel gear, a driving wheel having an enlarged end portion, said enlarged end portion being formed with conical faces, a driven wheel positioned adjacent said driving wheel and adapted to be rotated thereby, said driven wheel having a generally conical configuration of the same inclination as the conical faces formed on the enlarged end portion and defining a restricted area therewith, a film of liquid disposed in said restricted area, and means for maintaining said film under pressure to increase the viscosity thereof, transmission of power thereby being effected from the driving wheel to the driven wheel by means of the film of liquid under pressure.

References Cited in the file of this patent

UNITED STATES PATENTS

| | | |
|---|---|---|
| 1,015,031 | Landis | Jan. 16, 1912 |
| 1,017,893 | Landis | Feb. 20, 1912 |
| 1,238,447 | Severy | Aug. 28, 1917 |
| 1,334,844 | Day | Mar. 23, 1920 |
| 1,928,301 | Pierson | Sept. 26, 1933 |
| 1,981,910 | Ehrlich | Nov. 27, 1934 |
| 2,216,642 | Davis | Oct. 1, 1940 |
| 2,222,281 | Beier | Nov. 19, 1940 |
| 2,488,629 | Kline | Nov. 22, 1949 |
| 2,507,182 | Young | May 9, 1950 |
| 2,576,156 | Trofimov | Nov. 27, 1951 |

FOREIGN PATENTS

| | | |
|---|---|---|
| 401,371 | Great Britain | Nov. 16, 1933 |